United States Patent
Yu et al.

(10) Patent No.: US 12,416,357 B2
(45) Date of Patent: Sep. 16, 2025

(54) CONTROL APPARATUS FOR TRANSMISSION OF AGRICULTURAL WORK VEHICLE AND CONTROL METHOD FOR TRANSMISSION OF AGRICULTURAL WORK VEHICLE

(71) Applicant: LS MTRON LTD., Anyang-si (KR)

(72) Inventors: Ji Hun Yu, Anyang-si (KR); Jin Woong Lee, Anyang-si (KR); Ok Shik Shin, Anyang-si (KR); Bong Jin Cho, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 452 days.

(21) Appl. No.: 17/284,646

(22) PCT Filed: Sep. 20, 2019

(86) PCT No.: PCT/KR2019/012187
§ 371 (c)(1),
(2) Date: Apr. 12, 2021

(87) PCT Pub. No.: WO2020/080686
PCT Pub. Date: Apr. 23, 2020

(65) Prior Publication Data
US 2021/0396308 A1    Dec. 23, 2021

(30) Foreign Application Priority Data
Oct. 18, 2018 (KR) .................... 10-2018-0124485
Sep. 2, 2019 (KR) .................... 10-2019-0108182

(51) Int. Cl.
*F16H 59/56* (2006.01)
*F16H 59/48* (2006.01)
(Continued)

(52) U.S. Cl.
CPC ............. *F16H 59/56* (2013.01); *F16H 59/48* (2013.01); *F16H 59/54* (2013.01); *F16H 59/74* (2013.01);
(Continued)

(58) Field of Classification Search
CPC .......... F16H 59/56; F16H 59/48; F16H 59/54; F16H 59/74; F16H 61/02; F16H 2059/746; F16H 2061/0075
See application file for complete search history.

(56) References Cited

U.S. PATENT DOCUMENTS 5,024,305 A   6/1991   Kurihara et al.
5,662,548 A   9/1997   Mori
(Continued)

FOREIGN PATENT DOCUMENTS

CN   101228343 A   7/2008
CN   102338216 A   2/2012
(Continued)

OTHER PUBLICATIONS

Extended European Search Report for related European Application No. 19874051.6; action dated Apr. 20, 2022; (8 pages).
(Continued)

*Primary Examiner* — Dale W Hilgendorf
*Assistant Examiner* — Frank T Glenn, III
(74) *Attorney, Agent, or Firm* — K&L Gates LLP

(57) ABSTRACT

A control apparatus and a control method for a transmission of an agricultural work vehicle are provided, the control apparatus including: a forward/backward clutch of a forward/backward shifting unit that performs forward/backward shifting with respect to drive generated by an engine; and a drive clutch of a drive shifting unit that performs drive shifting with respect to the drive generated by the engine.

14 Claims, 9 Drawing Sheets

(51) Int. Cl.
*F16H 59/54* (2006.01)
*F16H 59/74* (2006.01)
*F16H 61/00* (2006.01)
*F16H 61/02* (2006.01)

(52) U.S. Cl.
CPC ....... *F16H 61/02* (2013.01); *F16H 2059/746* (2013.01); *F16H 2061/0075* (2013.01)

(56) References Cited

U.S. PATENT DOCUMENTS

| | | | | |
|---|---|---|---|---|
| 2004/0229728 | A1* | 11/2004 | Oshima | F16H 61/143 |
| | | | | 477/176 |
| 2004/0231951 | A1* | 11/2004 | Hasegawa | B60W 10/184 |
| | | | | 192/220 |
| 2006/0150624 | A1* | 7/2006 | Shah | F16H 61/431 |
| | | | | 60/445 |
| 2007/0087897 | A1 | 4/2007 | Kitamura | |
| 2008/0300105 | A1* | 12/2008 | Eriksson | B60W 30/18118 |
| | | | | 477/107 |
| 2011/0218716 | A1* | 9/2011 | Olsson | F16H 3/006 |
| | | | | 74/665 A |
| 2013/0116895 | A1* | 5/2013 | Smith | F16H 61/70 |
| | | | | 701/50 |
| 2016/0311433 | A1* | 10/2016 | Shelton | B60W 10/02 |

FOREIGN PATENT DOCUMENTS

| | | |
|---|---|---|
| CN | 107336706 A | 11/2017 |
| JP | H03200431 A | 9/1991 |
| JP | 2014156919 A | 8/2014 |
| JP | 2018017295 A | 2/2018 |
| KR | 10-1994-0009464 B1 | 10/1994 |
| KR | 20-2000-0006297 U | 4/2000 |
| KR | 20120001370 A | 1/2012 |

OTHER PUBLICATIONS

International Search Report for related International Application No. PCT/KR2019/012187; report dated Apr. 23, 2020; (5 pages).
Written Opinion for related International Application No. PCT/KR2019/012187; report dated Apr. 23, 2020; (4 pages).
Chinese Office action for related Chinese Application No. 201980065462.2; action dated Nov. 11, 2021; (5 pages).
Japanese Office Action for related Japanese Application No. 2021-521180; action dated May 23, 2022; (3 pages).

* cited by examiner

CONTROL APPARATUS FOR TRANSMISSION OF AGRICULTURAL WORK VEHICLE AND CONTROL METHOD FOR TRANSMISSION OF AGRICULTURAL WORK VEHICLE

CROSS-REFERENCE TO RELATED APPLICATIONS

The present application is a National Stage of International Application No. PCT/KR2019/012187 filed on Sep. 20, 2019, which claims priority to Korean Application No. 10-2018-0124485, filed on Oct. 18, 2018 and Korean Application No. 10-2019-0108182, filed on Sep. 2, 2019, the disclosures of which are incorporated herein by reference.

FIELD

The present disclosure relates to a control apparatus and control method for controlling a transmission of an agricultural work vehicle.

BACKGROUND

Agricultural work vehicles are used for cultivating crops necessary for human life using the land. For example, combines, tractors, and the like correspond to the agricultural work vehicles. The combines harvest and thresh crops such as rice, barley, wheat, and soybeans. The tractors perform work necessary for growing crops using a tractive force. Such an agricultural work vehicle includes a transmission for adjusting a torque, a speed, and the like as needed in a work process.

The transmission of a general vehicle implements an idling travel mode in which the vehicle slowly travels at a preset traveling stage using a torque converter even in a state in which a driver does not perform an operation on an accelerator pedal. Even when the transmission is controlled in the idling travel mode, the vehicle may not travel and remain in a stopped state due to the torque converter when the driver is applying the brake.

However, the transmission of an agricultural work vehicle according to the related art does not use a torque converter. Accordingly, when the agricultural work vehicle that has been started is switched from the stopped state to the idling travel mode just by operating a shuttle lever forward or rearward, even when the driver applies the brake, the agricultural work vehicle may not maintain the stopped state and travels due to a large traveling power (torque) of the agricultural work vehicle. Thus, since the transmission of the agricultural work vehicle according to the related art is switched to the idling travel mode even in a situation in which the driver does not intend to drive the agricultural work vehicle, the driving difficulty of the agricultural work vehicle increases, and a risk of increasing accidents is high.

SUMMARY

The present disclosure is designed to solve the problems and is for providing a transmission control device for an agricultural work vehicle and a transmission control method of an agricultural work vehicle that can prevent a transmission from being switched to an idling travel mode just by operating a shuttle lever forward or rearward.

In order to solve the above problems, the present disclosure may include the following configurations.

A transmission control device for an agricultural work vehicle including a front-rear clutch of a front-rear shifting part that performs front-rear shifting with respect to driving generated from an engine and a traveling clutch of a travel shifting part that performs travel shifting with respect to the driving generated by the engine according to the present disclosure includes: a reception module that receives operation information of a shuttle lever, operation information of a traveling operation mechanism, and operation information of a clutch operation mechanism from an operation unit including the shuttle lever for front-rear shifting control, the traveling operation mechanism for traveling control, and the clutch operation mechanism for release control of a main clutch among the front-rear clutch and the traveling clutch; an identification module that identifies, on the basis of the operation information of the shuttle lever, whether the shuttle lever is in a front-rear operation state in which the agricultural work vehicle moves forward or rearward or a neutral operation state in which the agricultural work vehicle does not move forward or rearward, identifies, on the basis of the operation information of the traveling operation mechanism, whether the traveling operation mechanism is in a traveling operation state in which the agricultural work vehicle travels or a traveling release state in which the agricultural work vehicle does not travel, and identifies, on the basis of the operation information of the clutch operation mechanism, whether the clutch operation mechanism is in a release operation state in which the main clutch is to be unfastened or a fastening operation state in which the main clutch is to be fastened; and a control module that controls, according to a result of the identification by the identification module, the transmission in any one of a traveling standby mode in which a traveling standby mode in which the agricultural work vehicle, the engine of which is started, is maintained in a stopped state, a normal traveling mode in which the agricultural work vehicle travels to correspond to operation of an acceleration operation mechanism of the traveling operation mechanism, and an idling travel mode in which the agricultural work vehicle travels in a state in which the engine is in an idle state.

The control module may control the transmission in the traveling standby mode when it is identified that the shuttle lever is in the front-rear operation state, the traveling operation mechanism is in the traveling release state, and the clutch operation mechanism is in a state in which the agricultural work vehicle, the engine of which is started, is stopped in the fastening operation state.

A transmission control method of an agricultural work vehicle including a front-rear clutch of a front-rear shifting part that performs front-rear shifting with respect to driving generated from an engine and a traveling clutch of a travel shifting part that performs travel shifting with respect to the driving generated by the engine according to the present disclosure includes: identifying an operation state of an operation unit including a shuttle lever for front-rear shifting control, a traveling operation mechanism for traveling control, and a clutch operation mechanism for release control of a main clutch among the front-rear clutch and the traveling clutch in a state in which the agricultural work vehicle, the engine of which is started, is stopped; in a stopped state of the agricultural work vehicle the engine of which is started, controlling the transmission in a traveling standby mode in which the agricultural work vehicle is maintained in the stopped state depending on a result obtained by identifying the operation state of the operation unit; and identifying an operation state of the traveling operation mechanism in the traveling standby mode; and controlling the transmission in a traveling mode in which the agricultural work vehicle travels when it is identified in the traveling standby mode that the traveling operation mechanism is in a traveling operation state in which the agricultural work vehicle travels.

The identifying of the operation state of the operation unit may include identifying whether the shuttle lever is in a front-rear operation state in which the agricultural work vehicle moves forward or rearward or in a neutral operation state in which the agricultural work vehicle does not move forward or rearward, identifying whether the traveling operation mechanism is in the traveling operation state or in a traveling release state in which the agricultural work vehicle does not travel, and identifying whether the clutch operation mechanism is in a release operation state in which the main clutch is to be released or in a fastening operation state in which the main clutch is to be fastened, The controlling of the transmission in the traveling standby mode may include switching the transmission to the traveling standby mode as releasing of the main clutch is maintained when it is identified that the shuttle lever is in the front-rear operation state, the traveling operation mechanism is in the traveling release state, and the clutch operation mechanism is in the fastening operation state, The identifying of the operation state of the traveling operation mechanism in the traveling standby mode may include identifying whether the traveling operation mechanism is in the traveling operation state or the traveling release state in the traveling standby mode.

The controlling of the transmission in the traveling mode may include: controlling the transmission in a normal traveling mode in which the agricultural work vehicle travels according to a degree of operation of an acceleration operation mechanism when it is identified that the acceleration operation mechanism of the traveling operation mechanism is in an acceleration operation state in which the agricultural work vehicle is accelerated; and controlling the transmission in an idling travel mode in which the agricultural work vehicle travels in a state in which the engine is in an idle state when it is identified that the acceleration operation mechanism is in an acceleration release state in which the agricultural work vehicle is not accelerated.

According to the present disclosure, a transmission control device can have the following effects.

According to the present disclosure, since a transmission can be controlled so that an agricultural work vehicle does not travel just by operating a shuttle lever forward or rearward in a state in which an agricultural work vehicle of which an engine is started is stopped, the agricultural work vehicle is prevented from traveling in a situation in which travel is not intended by a driver. Thus, the driving difficulty of the agricultural work vehicle can be reduced, and the occurrence of accidents can be prevented.

DETAILED DESCRIPTION

Hereinafter, embodiments of a transmission control device of an agricultural work vehicle according to the present disclosure will be described in detail with reference to the accompanying drawings.

Figure 1:
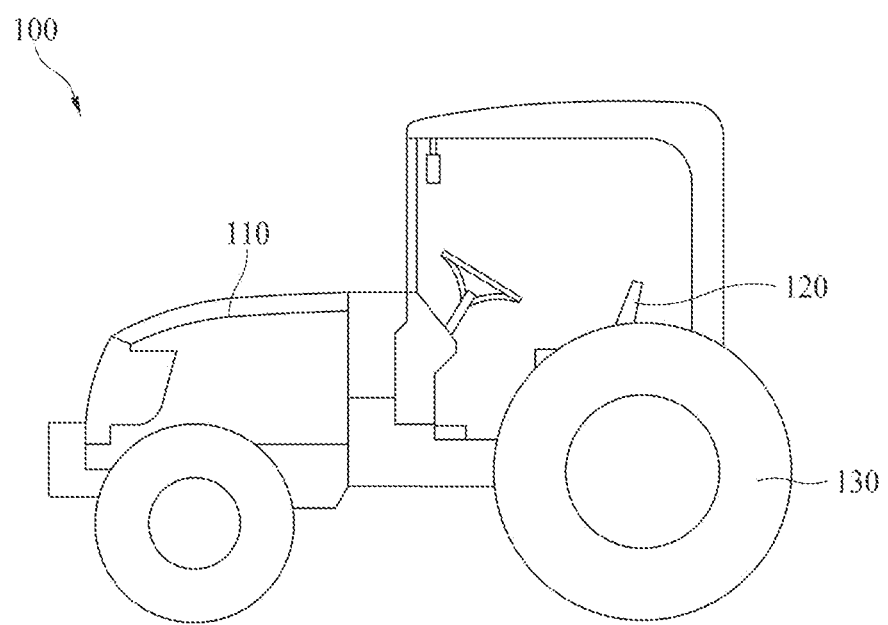
FIG. 1 is a schematic side view illustrating an example of an agricultural work vehicle.
Figure 2:
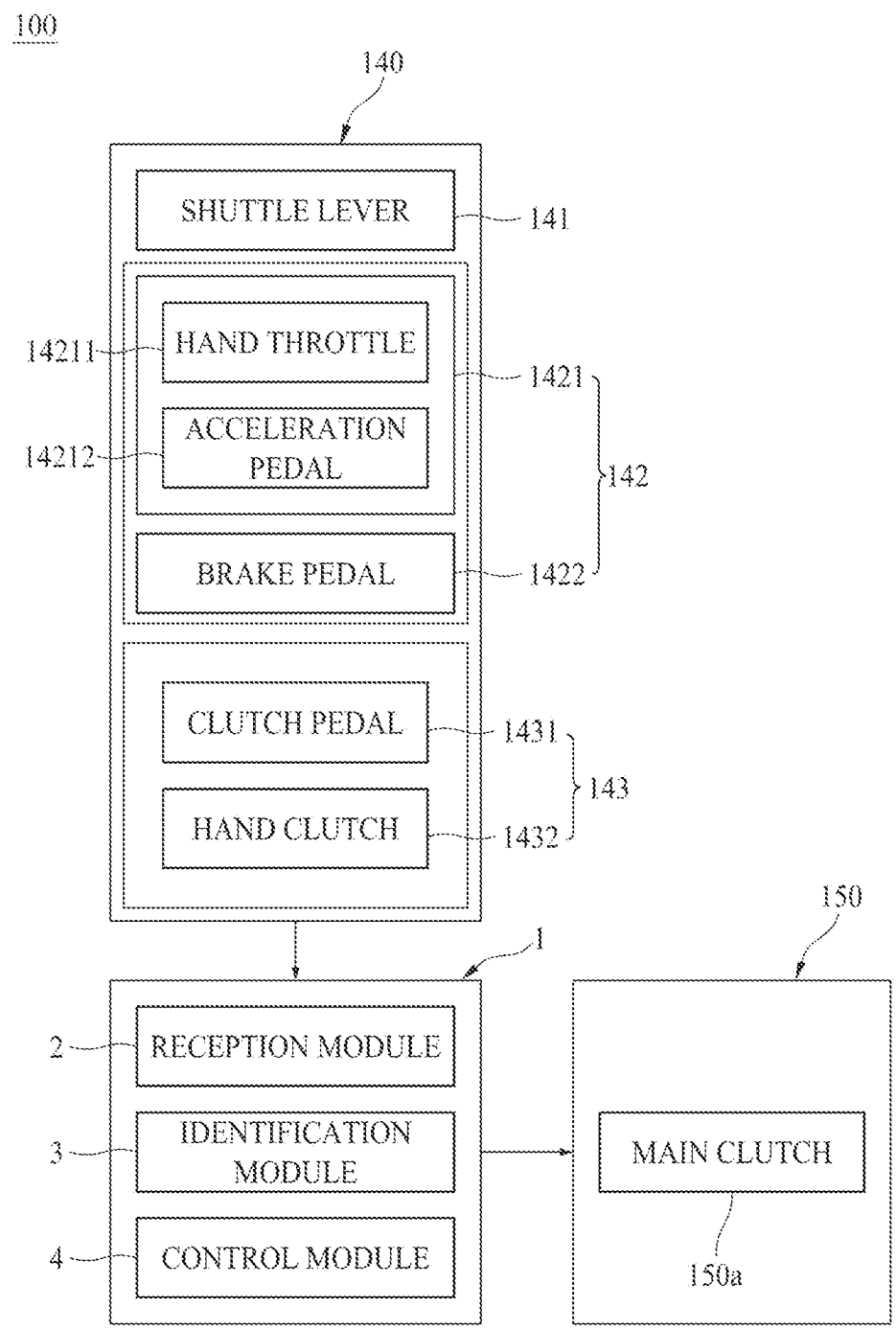
FIGS. 2 to 4 are schematic block diagrams of transmission control devices of an agricultural work vehicle according to the present disclosure.
Figure 3:
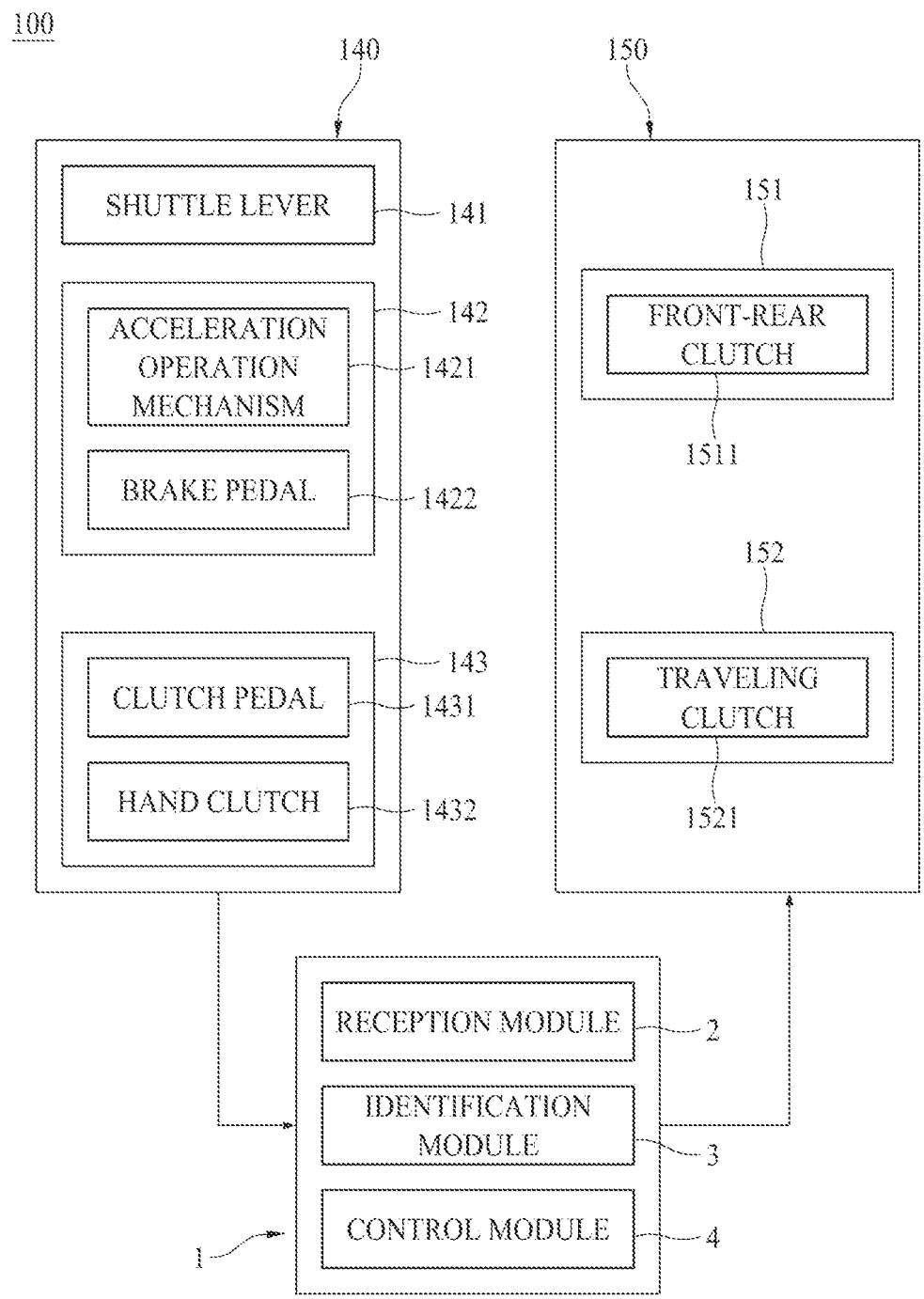

Referring to FIGS. 1 to 3, a transmission control device 1 of an agricultural work vehicle according to the present disclosure is applied to an agricultural work vehicle 100. The agricultural work vehicle 100 is used for cultivating crops necessary for human life by using the land. For example, the agricultural work vehicle 100 may be a tractor, a combine, or the like. Prior to describing the transmission control device 1 of the agricultural work vehicle according to the present disclosure, the agricultural work vehicle 100 will be described below.

The agricultural work vehicle 100 may include a vehicle body 110 to which an engine (not illustrated) is coupled, a driver seat 120 provided in the vehicle body 110, wheels 130 coupled to the vehicle body 110, an operation unit 140 provided at the driver seat 120, and a transmission 150 coupled to the vehicle body 110.

The operation unit 140 may include a shuttle lever 141, a traveling operation mechanism 142, and a clutch operation mechanism 143.

The shuttle lever 141 is for front-rear shift control. The shuttle lever 141 may be in a front-rear operation state for moving the agricultural work vehicle 100 forward or rearward. The shuttle lever 141 may be in a neutral operation state to prevent the agricultural work vehicle 100 from being moved forward or rearward. The shuttle lever 141 may be in the front-rear operation state or the neutral operation state according to operation by a driver.

The traveling operation mechanism 142 is for traveling control. The traveling operation mechanism 142 may be in a traveling operation state in which the agricultural work vehicle 100 travels. The traveling operation mechanism 142 may be in a traveling release state in which the agricultural work vehicle 100 does not travel. The traveling operation mechanism 142 may be in the traveling operation state or the traveling release state according to the operation by the driver.

The traveling operation mechanism 142 may include an acceleration operation mechanism 1421 and a brake pedal 1422.

The acceleration operation mechanism 1421 is for acceleration control. The acceleration operation mechanism 1421 may be in an acceleration operation state in which the agricultural work vehicle 100 is accelerated. When the acceleration operation mechanism 1421 is in the acceleration operation state, thus accelerating the agricultural work vehicle 100, the driving of the engine is changed according to the degree of operation of the acceleration operation mechanism 1421, and thus the agricultural work vehicle 100 may be accelerated. The acceleration operation mechanism 1421 may be in an acceleration release state in which the agricultural work vehicle 100 is not accelerated. The acceleration operation mechanism 1421 may be in the acceleration operation state or the acceleration release state according to the operation by the driver. The acceleration operation mechanism 1421 may include a hand throttle 14211 that the driver may operate with his/her hand, and an accelerator pedal 14212 that the driver may operate with his/her foot.

The brake pedal 1422 is for deceleration control. The brake pedal 1422 may be in a braking state in which a traveling speed of the agricultural work vehicle 100 is reduced. The brake pedal 1422 may be in a non-braking state in which the traveling speed of the agricultural work vehicle 100 is not reduced. The brake pedal 1422 may be in the braking state or in the non-braking state according to the operation by the driver. The brake pedal 1422 may be operated by the driver's foot.

The clutch operation mechanism 143 is for release control of a main clutch 150*a* (see FIG. 2) of the transmission 150. The main clutch 150*a* selectively transmits driving according to whether or not the main clutch 150*a* is fastened. When the main clutch 150*a* is fastened, the main clutch 150*a* may transmit the driving. When the main clutch 150*a* is released, the main clutch 150*a* may not transmit the driving. The clutch operation mechanism 143 may be in a release operation state for releasing the main clutch 150*a*. The clutch operation mechanism 143 may be in a fastening operation state for fastening the main clutch 150*a*. The clutch operation mechanism 143 may be in the release operation state or the fastening operation state according to the operation by the driver. The clutch operation mechanism 143 may include a clutch pedal 1431 which the driver may operate with his/her foot and a hand clutch 1432 which the driver may operate with his/her hand. The hand clutch 1432 may be a clutch switch (not illustrated).

The transmission 150 is for performing gear shifting with respect to the driving generated by the engine. The transmission control device 1 of the agricultural work vehicle according to the present disclosure may control the transmission 150 to identify an operation state of the operation unit 140 and to correspond to the operation state of the operation unit 140. The transmission 150 may include a front-rear shifting part 151 and a travel shifting part 152.

The front-rear shifting part 151 performs front-rear shifting with respect to the driving generated from the engine. The transmission control device 1 of the agricultural work vehicle according to the present disclosure may control the front-rear shifting part 151 to identify an operation state of the shuttle lever 141 and to correspond to the operation state of the shuttle lever 141. The front-rear shifting part 151 may include a front-rear clutch 1511. The front-rear shifting part 151 may transmit the driving, in which the front-rear shifting is performed, to the travel shifting part 152. When the front-rear clutch 1511 is fastened, the driving generated from the engine may be transmitted to the travel shifting part 152 after the front-rear shifting is performed. When the front-rear clutch 1511 is unfastened, the driving generated from the engine is not transmitted to the travel shifting part 152. The front-rear clutch 1511 may be implemented as a multiple disc clutch that selectively transmits the driving using friction. In this case, as the plurality of friction members come into contact with each other, the front-rear clutch 1511 may be fastened to transmit the driving. As the plurality of friction members are spaced apart from each other, the front-rear clutch 1511 may be unfastened so as not to transmit the driving. Meanwhile, the front-rear shifting part 151 may include at least one gear and at least one sleeve for the front-rear shifting.

The front-rear shifting part 151 may perform the front-rear shifting with respect to the driving in which the travel shifting is performed by the travel shifting part 152. In this case, the travel shifting part 152 may perform the travel shifting with respect to the driving generated from the engine, and the front-rear shifting part 151 may perform the front-rear shifting with respect to the driving in which the travel shifting is performed by the travel shifting part 152, and then the driving may be transmitted to an axle (not illustrated).

The travel shifting part 152 may perform the travel shifting with respect to the driving transmitted from the engine. The transmission control device 1 of the agricultural work vehicle according to the present disclosure may control the travel shifting part 152 to identify an operation state of the traveling operation mechanism 142 and to correspond to the operation state of the traveling operation mechanism 142. The travel shifting part 152 may include a traveling clutch 1521. The travel shifting part 152 may perform the travel shifting with respect to the driving transmitted from the front-rear shifting part 151. When the traveling clutch 1521 is fastened, the driving transmitted from the front-rear shifting part 151 may be transmitted to the axle after the travel shifting is performed. When the traveling clutch 1521 is unfastened, the driving transmitted from the front-rear shifting part 151 is not transmitted to the axle. The traveling clutch 1521 may be implemented as a multiple disc clutch that selectively transmits the driving using friction. In this case, as the plurality of friction members come into contact with each other, the traveling clutch 1521 may be fastened to transmit the driving. As the plurality of friction members are spaced apart from each other, the traveling clutch 1521 may be unfastened so as not to transmit the driving. The travel shifting part 152 may include a plurality of traveling clutches 1521. Meanwhile, the travel shifting part 152 may include at least one gear and at least one sleeve for the travel shifting.

The travel shifting part 152 may transmit the driving, in which the travel shifting is performed, to the front-rear shifting part 151. In this case, the travel shifting part 152 may perform the travel shifting with respect to the driving generated from the engine, and the front-rear shifting part 151 may perform the front-rear shifting with respect to the driving in which the travel shifting is performed by the travel shifting part 152, and then the driving may be transmitted to an axle.

Hereinafter, the description will be made based on an embodiment in which the front-rear shifting part 151 performs the front-rear shifting with respect to the driving generated from the engine, the travel shifting part 152 performs the travel shifting with respect to the driving transmitted from the front-rear shifting part 151, and then the driving is transmitted to the axle. From this, those skilled in the art to which the present disclosure belongs can easily understand the embodiment in which the travel shifting part 152 performs the travel shifting with respect to the driving generated from the engine, the front-rear shifting part 151 performs the front-rear shifting with respect to the driving transmitted from the travel shifting part 152, and then the driving is transmitted to the axle.

Here, one of the front-rear clutch 1511 and the traveling clutch 1521 may correspond to the main clutch 150*a*. When the front-rear clutch 1511 corresponds to the main clutch 150*a*, the clutch operation mechanism 143 may be in the release operation state in which the front-rear clutch 1511 is to be unfastened or in the fastening operation state in which the front-rear clutch 1511 is to be fastened. When the traveling clutch 1521 corresponds to the main clutch 150*a*, the clutch operation mechanism 143 may be in the release operation state in which the traveling clutch 1521 is to be unfastened or in the fastening operation state in which the traveling clutch 1521 is to be fastened. Which of the front-rear clutch 1511 and the traveling clutch 1521 corresponds to the main clutch 150*a* is determined according to an arrangement relationship, a connection relationship, and the like between the shifting parts and peripheral devices of the transmission 150.

In order to control the transmission 150 of the agricultural work vehicle 100, the transmission control device 1 of the agricultural work vehicle according to the present disclosure may include a reception module 2, an identification module 3, and a control module 4. The transmission control device 1 of an agricultural work vehicle according to the present disclosure may be coupled to the vehicle body 110 (see FIG. 1).

Referring to FIGS. 2 and 3, the reception module 2 is for receiving operation information from the agricultural work vehicle 100. The reception module 2 may receive the operation information from the operation unit 140. The reception module 2 may receive the operation information from the operation unit 140 using wired communication, wireless communication, or the like.

The reception module 2 may receive the operation information of the shuttle lever 141. The operation information of the shuttle lever 141 is information on which of the front-rear operation state and the neutral operation state the shuttle lever 141 belongs to. The reception module 2 may provide the operation information of the shuttle lever 141 to the identification module 3.

The reception module 2 may receive the operation information of traveling operation mechanism 142. The operation information of the traveling operation mechanism 142 is information on which of the traveling operation state and the traveling release state the traveling operation mechanism 142 belongs to. The reception module 2 may provide the operation information of the traveling operation mechanism 142 to the identification module 3.

When the traveling operation mechanism 142 includes the acceleration operation mechanism 1421, the reception module 2 may receive the operation information of the acceleration operation mechanism 1421. The operation information of the acceleration operation mechanism 1421 is information on which of the acceleration operation state and the acceleration release state the acceleration operation mechanism 1421 belongs to. When the acceleration operation mechanism 1421 includes the hand throttle 14211 and the accelerator pedal 14212, the reception module 2 may receive operation information of the hand throttle 14211 and operation information of the accelerator pedal 14212.

When the traveling operation mechanism 142 includes the brake pedal 1422, the reception module 2 may receive operation information of the brake pedal 1422. The operation information of the brake pedal 1422 is information on which of the braking state and the non-braking state the brake pedal 1422 belongs to.

The reception module 2 may receive operation information of the clutch operation mechanism 143. The operation information of the clutch operation mechanism 143 is information on which of the release operation state and the fastening operation state the clutch operation mechanism 143 belongs to. The reception module 2 may provide the operation information of the clutch operation mechanism 143 to the identification module 3. When the clutch operation mechanism 143 includes the clutch pedal 1431 and the hand clutch 1432, the reception module 2 may receive operation information of the clutch pedal 1431 and operation information of the hand clutch 1432.

Referring to FIGS. 2 and 3, the identification module 3 is for identifying the operation information received by the reception module 2.

The identification module 3 may identify, on the basis of the operation information of the shuttle lever 141, whether the shuttle lever belongs to the front-rear operation state or the neutral operation state. When it is identified that the shuttle lever 141 is in the front-rear operation state, the identification module 3 may provide a front-rear operation signal to the control module 4. When it is determined that the shuttle lever 141 is in the neutral operation state, the identification module 3 may provide a neutral operation signal to the control module 4.

The identification module 3 may identify whether the traveling operation mechanism 142 is in the traveling operation state or the traveling release state on the basis of the operation information of the traveling operation mechanism 142. When it is identified that the traveling operation mechanism 142 is in the traveling operation state, the identification module 3 may provide a traveling operation signal to the control module 4. When it is identified that the traveling operation mechanism 142 is in the traveling release state, the identification module 3 may provide a traveling release signal to the control module 4.

When the traveling operation mechanism 142 includes the acceleration operation mechanism 1421, the identification module 3 may identify whether the acceleration operation mechanism 1421 is in the acceleration operation state or the acceleration release state on the basis of the operation information of the acceleration operation mechanism 1421. When it is identified that the acceleration operation mechanism 1421 is in the acceleration operation state, the identification module 3 may provide an acceleration operation signal to the control module 4. When it is identified that the acceleration operation mechanism 1421 is in the acceleration release state, the identification module 3 may provide an acceleration release signal to the control module 4.

When the traveling operation mechanism 142 includes the brake pedal 1422, the identification module 3 may identify whether the brake pedal 1422 is in the braking state or the non-braking state on the basis of the operation information of the brake pedal 1422. When it is identified that the brake pedal 1422 is in the braking state, the identification module 3 may provide a braking signal to the control module 4. When it is identified that the brake pedal 1422 is in the non-braking state, the identification module 3 may provide a non-braking signal to the control module 4.

When the identification module 3 identifies only the operation state of the acceleration operation mechanism 1421 without identifying the operation state of the brake pedal 1422, the traveling operation mechanism 142 may correspond to the traveling release state when the acceleration operation mechanism 1421 is in the acceleration release state. In this case, when the acceleration operation mechanism 1421 is in the acceleration operation state, the traveling operation mechanism 142 may correspond to the traveling operation state.

When the identification module 3 identifies both the operation state of the acceleration operation mechanism 1421 and the operation state of the brake pedal 1422, the traveling operation mechanism 142 may correspond to the traveling release state when the acceleration operation mechanism 1421 is in the acceleration release state and when the brake pedal 1422 is in the braking state. In this case, the traveling operation mechanism 142 may correspond to the traveling operation state when the brake pedal 1422 is in the non-braking state regardless of the operation state of the acceleration operation mechanism 1421.

The identification module 3 may identify whether the clutch operation mechanism 143 is in the release operation state or the fastening operation state on the basis of the operation information of the clutch operation mechanism 143. When it is identified that the clutch operation mechanism 143 is in the release operation state, the identification module 3 may provide a release operation signal to the control module 4. When it is identified that the clutch operation mechanism 143 is in the fastening operation state, the identification module 3 may provide a fastening operation signal to the control module 4.

Referring to FIGS. 2 and 3, the control module 4 controls the transmission 150 according to the result identified by the identification module 3. The control module 4 may control the transmission 150 in one of a traveling standby mode, an idling travel mode, and a normal traveling mode. In the traveling standby mode, the agricultural work vehicle 100, the engine of which is started, is maintained in a stopped state. In the idling travel mode, the agricultural work vehicle 100 travels in a state in which the engine is in an idle state. In this case, the agricultural work vehicle 100 may travel at a preset low traveling speed in a state in which the acceleration operation mechanism 1421 is not operated. Accordingly, the driver may allow the agricultural work vehicle 100 to travel at the present low traveling speed even without operating the hand throttle 14211 and the accelerator pedal 14212. In the normal traveling mode, the agricultural work vehicle 100 travels to correspond to the operation of the acceleration operation mechanism 1421. In this case, the agricultural work vehicle 100 may travel by driving of the engine and a travel shifting stage corresponding to a degree to which the acceleration operation mechanism 1421 is operated. Accordingly, the driver may allow the agricultural work vehicle 100 to travel at a desired traveling speed by operating at least one of the hand throttle 14211 and the accelerator pedal 14212.

The control module 4 may control the transmission 150 in the traveling standby mode when it is identified that the shuttle lever 141 is in the front-rear operation state, the traveling operation mechanism 142 is in the traveling release state, and the clutch operation mechanism 143 is in a state in which the agricultural work vehicle 100, the engine of which is started, is stopped in the fastening operation state. Accordingly, the transmission control device 1 of the agricultural work vehicle according to the present disclosure may control the transmission 150 so that the agricultural work vehicle 100 does not travel only by operating the shuttle lever 141 forward or rearward in a state in which the agricultural work vehicle 100, the engine of which is started, is stopped. Further, the transmission control device 1 of the agricultural work vehicle according to the present disclosure may control the transmission 150 so that the agricultural work vehicle 100 does not travel only by operating the clutch operation mechanism 143 in a state in which the agricultural work vehicle 100, the engine of which is started, is stopped in the fastening operation state. Thus, in the transmission control device 1 of the agricultural work vehicle according to the present disclosure, since the agricultural work vehicle 100 may be prevented from traveling in a situation in which travel is not intended by the driver, the driving difficulty in the agricultural work vehicle 100 can be lowered, and the occurrence of accidents can be prevented. The control module 4 may control the transmission 150 in the traveling standby mode when the front-rear operation signal, the traveling release signal, and the fastening operation signal are received from the identification module 3 in a state in which the agricultural work vehicle 100, the engine of which is started, is stopped.

When controlling the transmission 150 in the traveling standby mode, the control module 4 may control the transmission 150 so that releasing of the main clutch 150a is maintained. That is, the control module 4 may maintain the releasing of the main clutch 150a even when the clutch operation mechanism 143 is in the fastening operation state in the traveling standby mode. Thus, in the traveling standby mode, the control module 4 may maintain a state in which the agricultural work vehicle 100, the engine of which is started, is stopped.

For example, when the traveling clutch 1521 corresponds to the main clutch 150a, in the traveling standby mode, the control module 4 may control the transmission 150 so that the releasing of the traveling clutch 1521 is maintained. In this case, in the traveling standby mode, since the shuttle lever 141 is in the front-rear operation state, the control module 4 may control the front-rear clutch 1511 in a fastened state. Accordingly, immediately after the traveling clutch 1521 is fastened, the control module 4 may control the front-rear shifting part 151 to wait in a state in which the driving is receivable from the front-rear shifting part 151. Thus, the control module 4 may shorten a time for which the traveling standby mode is switched to the idling travel mode or the normal traveling mode.

For example, when the front-rear clutch 1511 corresponds to the main clutch 150a, in the traveling standby mode, the control module 4 may control the transmission 150 so that the releasing of the front-rear clutch 1511 is maintained. In this case, the control module 4 may control the transmission 150 so that the traveling clutch 1521 is fastened or the fastening with the traveling clutch 1521 is maintained. That is, in the traveling standby mode, the control module 4 may control the traveling clutch 1521 in a fastened state. Accordingly, immediately after the front-rear clutch 1511 is fastened, the control module 4 may control the travel shifting part 152 to wait in a state in which the travel shifting part 152 may transmit the driving. Thus, the control module 4 may shorten a time for which the traveling standby mode is switched to the idling travel mode or the normal traveling mode.

When the front-rear clutch 1511 corresponds to the main clutch 150a, the releasing of the traveling clutch 1521 when the agricultural work vehicle 100 is started may be maintained, and the traveling clutch 1521 may be fastened in the traveling standby mode. When controlling the transmission 150 in the traveling standby mode, the control module 4 may control the transmission 150 so that the releasing of the front-rear clutch 1511 is maintained and the traveling clutch 1521 is fastened.

When the front-rear clutch 1511 corresponds to the main clutch 150a, the traveling clutch 1521 may be fastened when the agricultural work vehicle 100 is started and may be maintained in a fastened state in the traveling standby mode. When controlling the transmission 150 in the traveling standby mode, the control module 4 may control the transmission 150 so that the releasing of the front-rear clutch 1511 is maintained, and the fastening of the traveling clutch 1521 is maintained.

Figure 4:
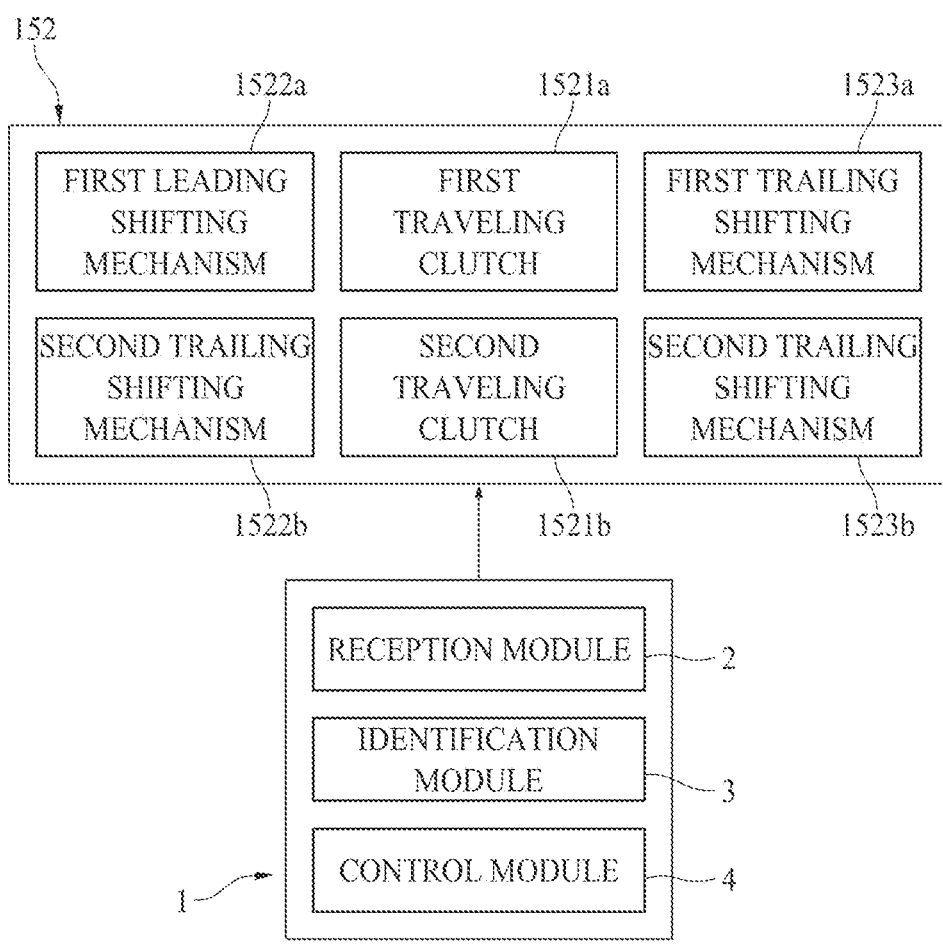
Figure 5:
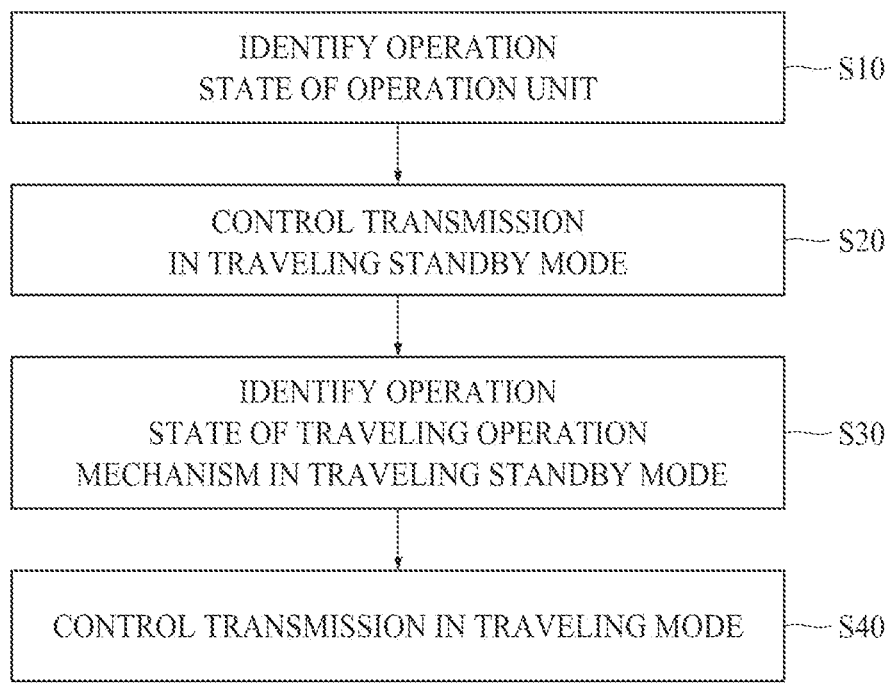
FIGS. 5 to 9 are schematic flowcharts of a transmission control method of the agricultural work vehicle according to the present disclosure.
Figure 6:
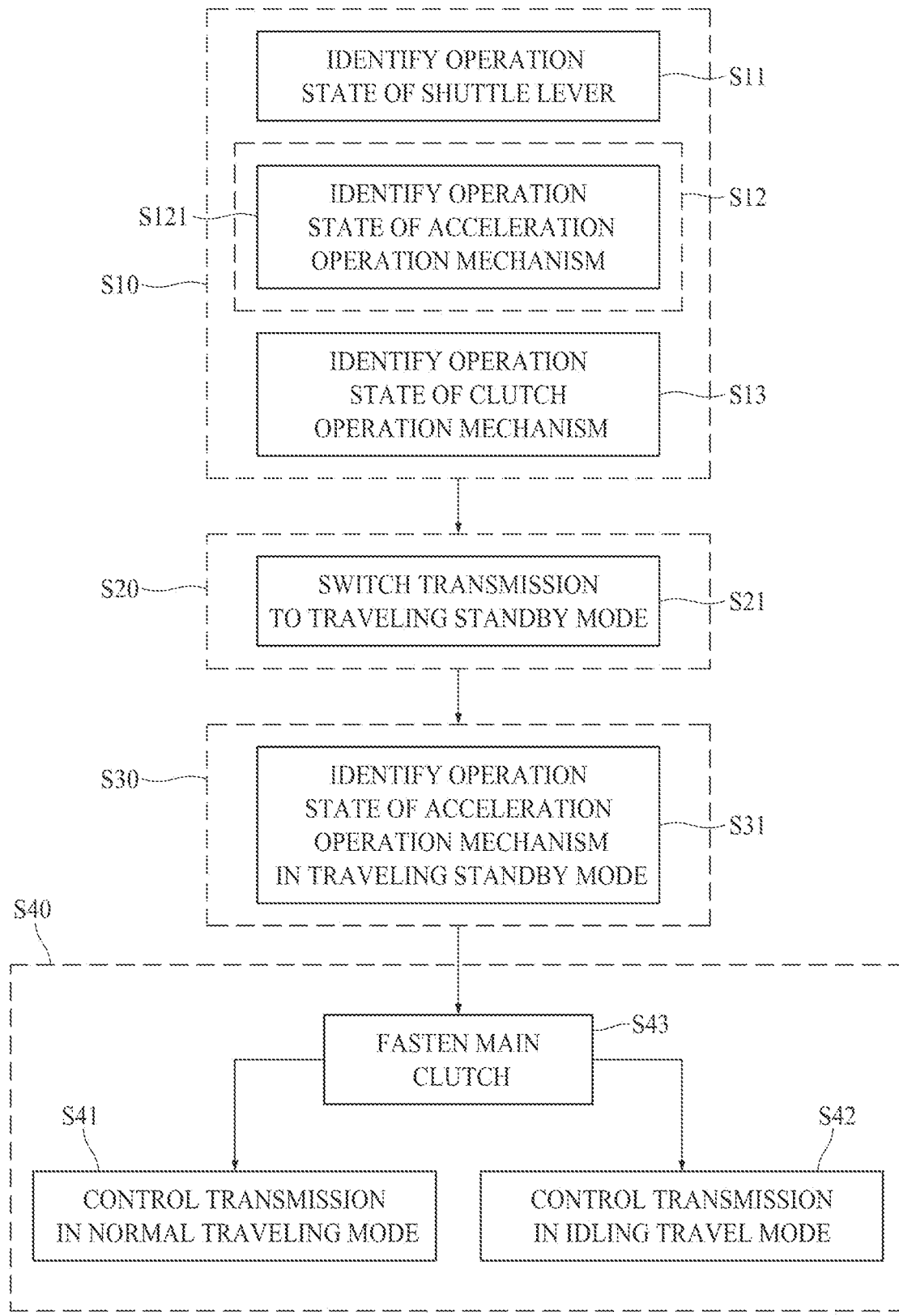
Figure 7:
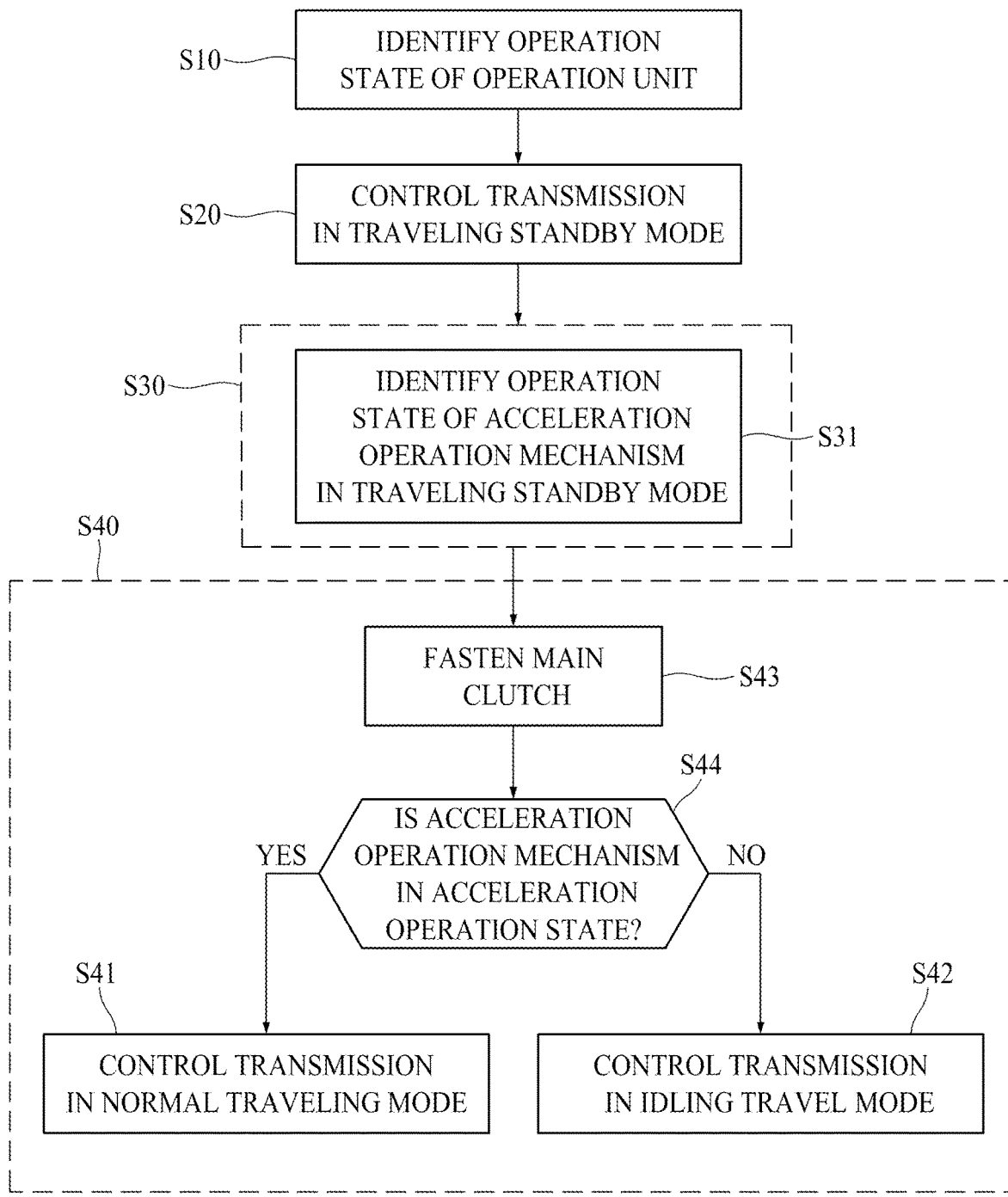
Figure 8:
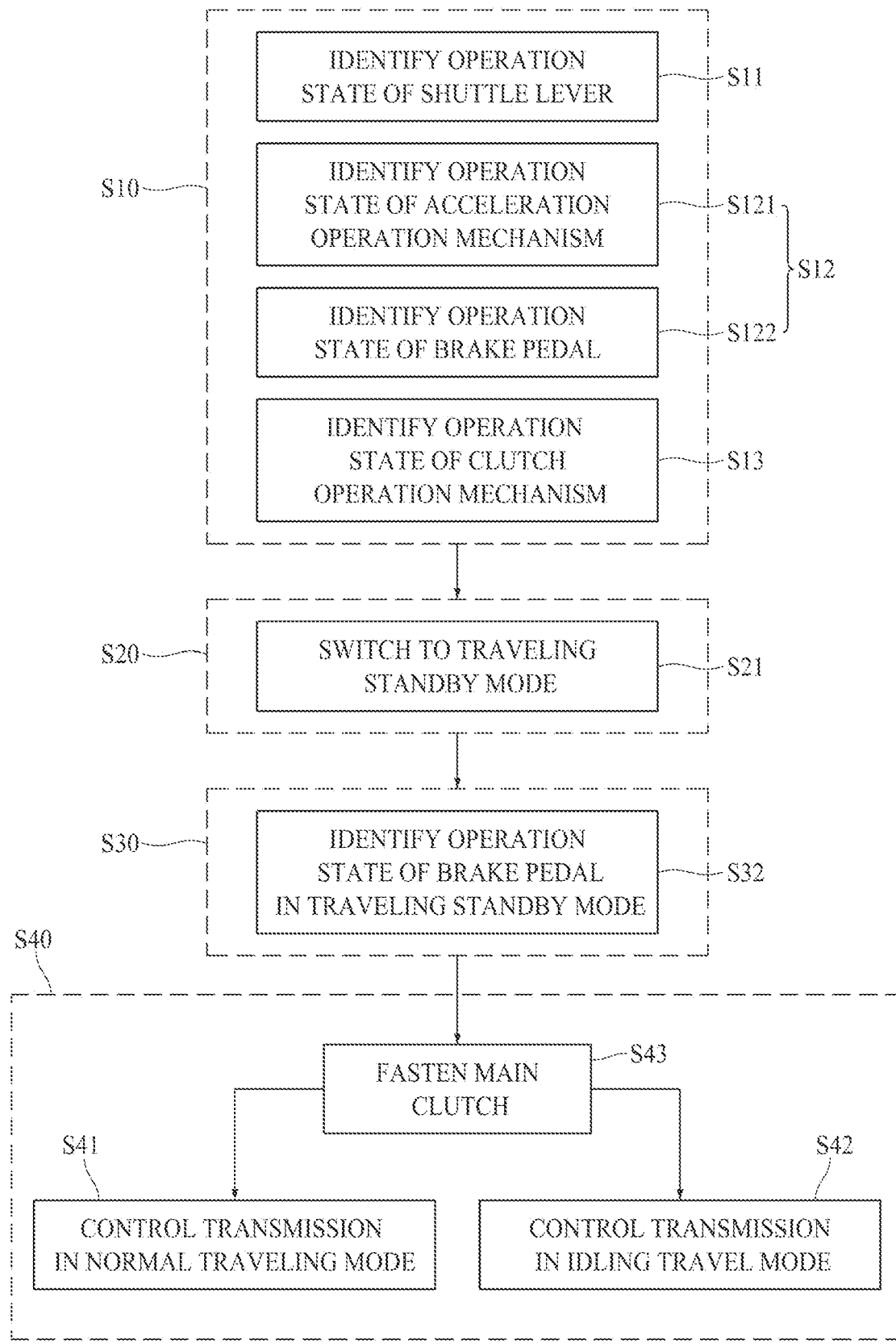
Figure 9:
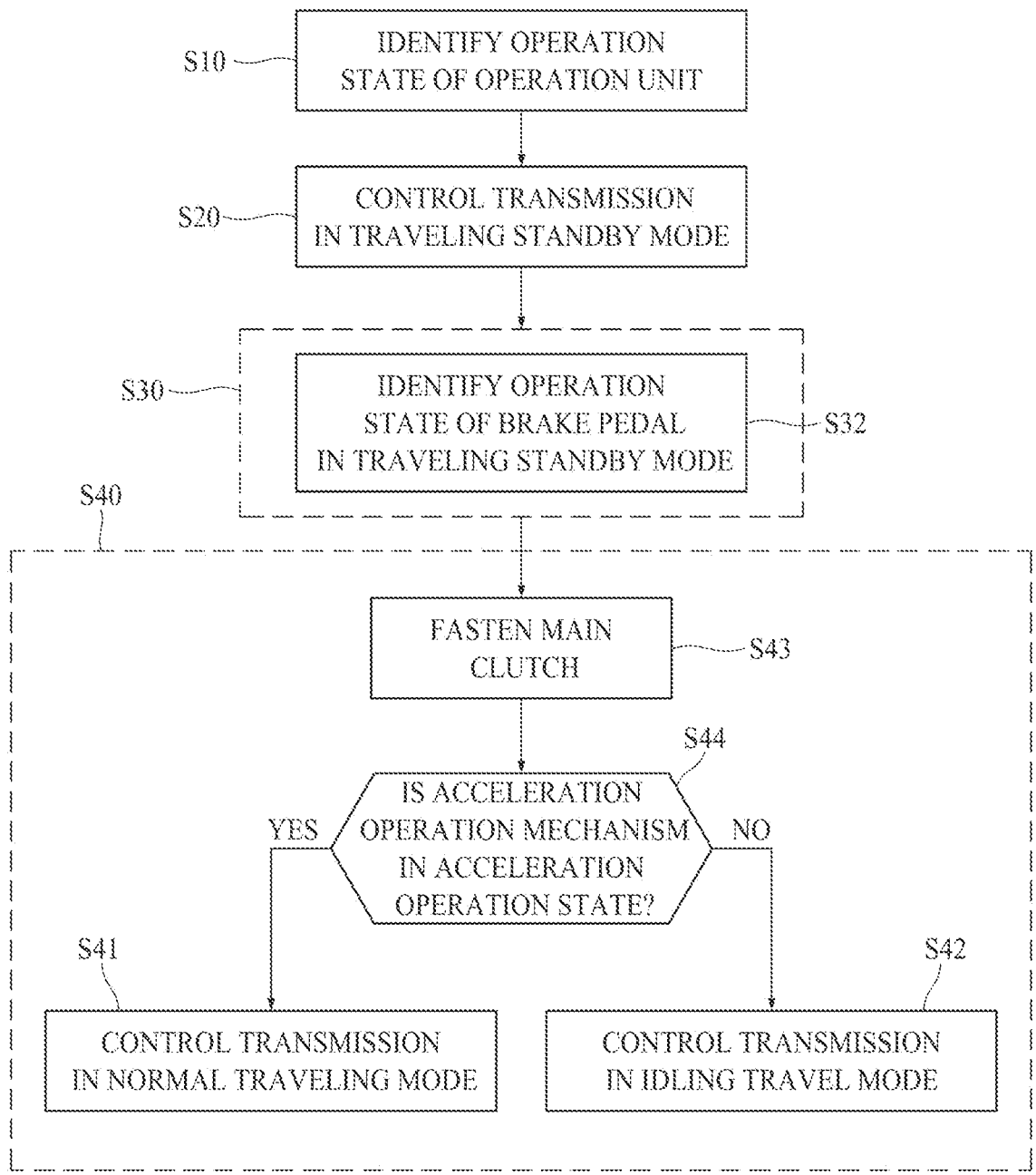

Referring to FIGS. 2 to 4, when the transmission 150 is implemented as a dual clutch transmission (DCT) and the front-rear clutch 1511 is implemented as the main clutch 150a, the control module 4 may control the transmission 150 in the traveling standby mode by controlling the travel shifting part 152 so that one of a first traveling clutch 1521a and a second traveling clutch 1521b is fastened or fastening of one of the first traveling clutch 1521a and the second traveling clutch 1521b is maintained.

The first traveling clutch 1521a and the second traveling clutch 1521b will be described in detail below.

First, the first traveling clutch 1521a is connected to at least one of a first leading shifting mechanism 1522a and a trailing shifting mechanism 1523a. When the first traveling clutch 1521a is fastened, the driving may be transmitted from the first leading shifting mechanism 1522a via the first traveling clutch 1521*a* to the first trailing shifting mechanism 1523*a*. When the first traveling clutch 1521*a* is unfastened, the driving may not be transmitted from the first leading shifting mechanism 1522*a* via the first traveling clutch 1521*a* to the first trailing shifting mechanism 1523*a*. The first leading shifting mechanism 1522*a* may correspond to a main shifting part, and the first trailing shifting mechanism 1523*a* may correspond to a sub-shifting part. The first leading shifting mechanism 1522*a* may correspond to a sub-shifting part, and the first trailing shifting mechanism 1523*a* may correspond to a main shifting part. Meanwhile, the first traveling clutch 1521*a* may be connected to only at least one of the first leading shifting mechanism 1522*a* and the first trailing shifting mechanism 1523*a*. The first traveling clutch 1521*a* may be connected to only one of the first leading shifting mechanism 1522*a* and the first trailing shifting mechanism 1523*a* and thus may be implemented so that the driving generated by the engine is transmitted to or is not transmitted to the axle through the first leading shifting mechanism 1522*a* and the first trailing shifting mechanism 1523*a*.

Next, the second traveling clutch 1521*b* is connected to at least one of a second leading shifting mechanism 1522*b* and a second trailing shifting mechanism 1523*b*. When the second traveling clutch 1521*b* is fastened, the driving may be transmitted from the second leading shifting mechanism 1522*b* via the second traveling clutch 1521*b* to the second trailing shifting mechanism 1523*b*. When the second traveling clutch 1521*b* is unfastened, the driving may not be transmitted from the second leading shifting mechanism 1522*b* via the second traveling clutch 1521*b* to the second trailing shifting mechanism 1523*b*. The second leading shifting mechanism 1522*b* may correspond to a main shifting part, and the second trailing shifting mechanism 1523*b* may correspond to a sub-shifting part. The second leading shifting mechanism 1522*b* may correspond to a sub-shifting part, and the second trailing shifting mechanism 1523*b* may correspond to a main shifting part. Meanwhile, the second traveling clutch 1521*b* may be connected to only at least one of the second leading shifting mechanism 1522*b* and the second trailing shifting mechanism 1523*b*. The second traveling clutch 1521*b* may be connected to only one of the second leading shifting mechanism 1522*b* and the second trailing shifting mechanism 1523*b* and thus may be implemented so that the driving generated by the engine is transmitted to or is not transmitted to the axle through the second leading shifting mechanism 1522*b* and the second trailing shifting mechanism 1523*b*.

When the front-rear clutch 1511 is implemented as the main clutch 150*a*, in the traveling standby mode, the control module 4 may control the travel shifting part 152 so that the releasing of the front-rear clutch 1511 is maintained, any one of the first traveling clutch 1521*a* and the second traveling clutch 1521*b* is fastened, or the fastening of any one of the first traveling clutch 1521*a* and the second traveling clutch 1521*b* is maintained. Accordingly, immediately after the front-rear clutch 1511 is fastened, the control module 4 may control the travel shifting part 152 to wait in a state in which the driving may be transmitted through any one of the first traveling clutch 1521*a* and the second traveling clutch 1521*b*. Thus, even when the transmission 150 is implemented as the DCT, the control module 4 may shorten a time for which the traveling standby mode is switched to the idling travel mode or the normal traveling mode.

When it is identified that in the traveling standby mode, the acceleration operation mechanism 1421 is in the acceleration operation state, the control module 4 may control the transmission 150 so that the main clutch 150*a* is fastened. Accordingly, the transmission 150 may transmit the driving generated from the engine to the axle. Thus, the agricultural work vehicle 100 may start and travel. In the traveling standby mode, an operation of identifying whether the acceleration operation mechanism 1421 is in the acceleration operation state or the acceleration release state may be performed by the identification module 3. In the traveling standby mode, when it is identified that the acceleration operation mechanism 1421 is in the acceleration operation state, the identification module 3 may provide the acceleration operation signal to the control module 4. In the traveling standby mode, when receiving the acceleration operation signal from the identification module 3, the control module 4 may fasten the main clutch 150*a*. Meanwhile, in the traveling standby mode, when it is identified that the acceleration operation mechanism 1421 is in the acceleration release state, the control module 4 may maintain the releasing of the main clutch 150*a*.

When it is identified that the acceleration operation mechanism 1421 is in a state in which the main clutch 150*a* is fastened in the acceleration operation state, the control module 4 may control the transmission 150 in the normal traveling mode. In the normal traveling mode, the control module 4 may control the transmission 150 so that the agricultural work vehicle 100 travels according to the degree of operation of the acceleration operation mechanism 1421. An operation of identifying whether the acceleration operation mechanism 1421 is in a state in which the main clutch 150*a* is fastened may be performed by the identification module 3 in the acceleration operation state or the acceleration release state. When it is identified that the acceleration operation mechanism 1421 is in a state in which the main clutch 150*a* is fastened in the acceleration operation state, the identification module 3 may provide the acceleration operation signal to the control module 4. When receiving the acceleration operation signal from the identification module 3 in a state in which the main clutch 150*a* is fastened, the control module 4 may control the transmission 150 in the normal traveling mode. Meanwhile, in the traveling standby mode, as it is identified that the acceleration operation mechanism 1421 is in the acceleration operation state, the main clutch 150*a* is fastened. Thus, when it is identified that the acceleration operation mechanism 1421 is maintained in a state in which the main clutch 150*a* is fastened in the acceleration operation state, the control module 4 may control the transmission 150 in the normal traveling mode.

When it is identified that the acceleration operation mechanism 1421 is in a state in which the main clutch 150*a* is fastened in the acceleration release state, the control module 4 may control the transmission 150 in the idling travel mode. In the idling travel mode, the control module 4 may control the transmission 150 so that the agricultural work vehicle 100 travels at the preset low traveling speed in a state in which the engine is in an idle state. In this case, the control module 4 may control the transmission 150 so that both the front-rear clutch 1511 and the traveling clutch 1521 are maintained in a fastened state. When it is identified that the acceleration operation mechanism 1421 is in a state in which the main clutch 150*a* is fastened in the acceleration release state, the identification module 3 may provide the acceleration release signal to the control module 4. When receiving the acceleration release signal from the identification module 3 in a state in which the main clutch 150*a* is fastened, the control module 4 may control the transmission 150 in the idling travel mode.

In this way, in the traveling standby mode, the transmission control device 1 of an agricultural work vehicle according to the present disclosure may be implemented to control the transmission 150 so that the main clutch 150*a* is fastened according to the operation state of the traveling operation mechanism 142, and to control the transmission 150 in the normal traveling mode or the idling travel mode according to the operation state of the acceleration operation mechanism 1421 in a state in which the main clutch 150*a* is fastened.

Here, the transmission control device 1 of an agricultural work vehicle according to a modified embodiment of the present disclosure may control the transmission 150 in the traveling standby mode, the normal traveling mode, and the idling travel mode additionally in consideration of whether the brake pedal 1422 is in the braking state or the non-braking state. Detailed description thereof will be described below.

First, the reception module 2 may additionally receive the operation information of the brake pedal 1422 from the operation unit 140. Accordingly, the reception module 2 may receive, from the operation unit 140, the operation information of the shuttle lever 141, the operation information of the acceleration operation mechanism 1421, the operation information of the brake pedal 1422, and the operation information of the clutch operation mechanism 143.

Next, the identification module 3 may additionally identify whether the brake pedal 1422 is in the braking state or the non-braking state. Accordingly, the identification module 3 may identify whether the shuttle lever 141 is in the front-rear operation state or the neutral operation state, identify whether the acceleration operation mechanism 1421 is in the acceleration operation state or the acceleration release state, identify whether the brake pedal 1422 is in the braking state or the non-braking state, and identify whether the clutch operation mechanism 143 is in the release operation state or the fastening operation state.

Next, in a state in which the agricultural work vehicle 100, the engine of which is started, is stopped, when it is identified that the shuttle lever 141 is in the front-rear operation state, the traveling operation mechanism 142 is in the acceleration release state, the brake pedal 1422 is in the braking state, and the clutch operation mechanism 143 is in the fastening operation state, the control module 4 may control the transmission in the traveling standby mode as the releasing of the main clutch 150*a* is maintained.

Next, in the traveling standby mode, when it is identified that the brake pedal 1422 is in the non-braking state, the control module 4 may control the transmission 150 so that the main clutch 150*a* is fastened. In the traveling standby mode, the fact that the brake pedal 1422 is in the non-braking state may be identified by the identification module 3.

Next, in a state in which the main clutch 150*a* is fastened, the control module 4 may control the transmission 150 in the normal traveling mode or the idling travel mode according to whether the acceleration operation mechanism 1421 is in the acceleration operation state or the acceleration release state. Whether the acceleration operation mechanism 1421 is in a state in which the main clutch 150*a* is fastened in the acceleration operation state or the acceleration release state may be identified by the identification module 3.

When it is identified that the acceleration operation mechanism 1421 is in a state in which the main clutch 150*a* is fastened in the acceleration operation state, the control module 4 may control the transmission 150 in the normal traveling mode.

When it is identified that the acceleration operation mechanism 1421 is in a state in which the main clutch 150*a* is fastened in the acceleration release state, the control module 4 may control the transmission 150 in the idling travel mode. Meanwhile, since the acceleration operation mechanism 1421 has been maintained in the acceleration release state from the traveling standby mode, the control module 4 may control the transmission 150 in the idling travel mode when it is identified that the acceleration operation mechanism 1421 is maintained in a state in which the main clutch 150*a* is fastened in the acceleration release state.

In this way, in the traveling standby mode, the transmission control device 1 of an agricultural work vehicle according to the modified embodiment of the present disclosure may be implemented to control the transmission 150 so that the main clutch 150*a* is fastened according to the operation state of the brake pedal 1422, and to control the transmission 150 in the normal traveling mode or the idling travel mode according to the operation state of the acceleration operation mechanism 1421 in a state in which the main clutch 150*a* is fastened.

Hereinafter, embodiments of a transmission control method of an agricultural work vehicle according to the present disclosure will be described in detail with reference to the accompanying drawings.

Referring to FIGS. 1 to 6 and 8, the transmission control method of the agricultural work vehicle according to the present disclosure relates to controlling the transmission 150 of the agricultural work vehicle 100. The transmission control method of the agricultural work vehicle according to the present disclosure may be performed by the above-described transmission control device 1 of the agricultural work vehicle according to the present disclosure. The transmission control method of the agricultural work vehicle according to the present disclosure may include the following operation.

First, the operation state of the operation unit 140 is identified (S10). Operation S10 may be performed by identifying the operation state of the shuttle lever 141, the operation state of the traveling operation mechanism 142, and the operation state of the clutch operation mechanism 143 in a state in which the agricultural work vehicle 100, the engine of which is started, is stopped. Operation S10 of identifying the operation state of the operation unit may be performed by the identification module 3. The identification module 3 may identify the operation state of the operation unit 140 by using the operation information provided from the reception module 2. Operation S10 of identifying the operation state of the operation unit may include operation S11 of identifying whether the shuttle lever 141 is in the front-rear operation state or the neutral operation state, operation S12 of identifying whether the traveling operation mechanism 142 is in the traveling operation state or the traveling release state, and operation S13 of identifying whether the clutch operation mechanism 143 is in the release operation state or the fastening operation state.

Next, the transmission 150 is controlled in the traveling standby mode (S20). Operation S20 may be performed by controlling the transmission 150 in the traveling standby mode according to the result obtained by identifying the operation state of the operation unit 140 in a state in which the agricultural work vehicle, the engine of which is started, is stopped. Operation S20 of controlling the transmission 150 in the traveling standby mode may be performed by controlling the transmission 150 in the traveling standby mode when it is identified that the shuttle lever 141 is in the front-rear operation state, the traveling operation mechanism 142 is in the traveling release state, and the clutch operation mechanism 143 is in a state in which the agricultural work vehicle 100, the engine of which is started, is stopped in the fastening operation state. When operation S20 of controlling the transmission in the traveling standby mode is performed, the agricultural work vehicle 100 may be maintained in a stopped state even when the shuttle lever 141 is in the front-rear operation state and the clutch operation mechanism 143 is in the fastening operation state.

Accordingly, in the transmission control method of the agricultural work vehicle according to the present disclosure, the transmission 150 may be controlled so that the agricultural work vehicle 100 does not travel only due to operating the shuttle lever 141 forward or rearward in a state in which the agricultural work vehicle 100, the engine of which is started, is stopped. Further, in the transmission control method of the agricultural work vehicle according to the present disclosure, the transmission 150 may be controlled so that the agricultural work vehicle 100 does not travel only due to operating the clutch operation mechanism 143 in a state in which the agricultural work vehicle 100, the engine of which is started, is stopped in the fastening operation state. Thus, in the transmission control method of the agricultural work vehicle according to the present disclosure, since the agricultural work vehicle 100 may be prevented from traveling in a situation in which travel is not intended by the driver, the driving difficulty in the agricultural work vehicle 100 can be lowered, and the occurrence of accidents can be prevented.

Operation S20 of controlling the transmission in the traveling standby mode may be performed by the control module 4. When receiving the front-rear operation signal, the traveling release signal, and the fastening operation signal from the identification module 3, the control module 4 may control the transmission 150 in the traveling standby mode.

Next, in the traveling standby mode, the operation state of the traveling operation mechanism 142 is identified (S30). In the traveling standby mode, operation S30 may be performed by identifying whether the traveling operation mechanism 142 is in the traveling operation state or the traveling release state. In the traveling standby mode, operation S30 of identifying the operation state of the traveling operation mechanism may be performed by the identification module 3.

Next, the transmission 150 is controlled in a traveling mode (S40). In the traveling standby mode, operation S40 may be performed by controlling the transmission 150 in the traveling mode in which the agricultural work vehicle travels when it is determined that the traveling operation mechanism 142 in the traveling operation state. Operation S40 of controlling the transmission in the traveling mode may be performed by the control module 4.

Operation S40 of controlling the transmission in the traveling mode may include operation S41 of controlling the transmission in the normal traveling mode and operation S42 of controlling the transmission in the idling travel mode.

Operation S41 of controlling the transmission in the normal traveling mode may be performed by controlling the transmission 150 in the normal traveling mode when it is identified that the acceleration operation mechanism 1421 is in the acceleration operation state. Operation S41 of controlling the transmission 150 in the normal traveling mode may be performed by the control module 4. When receiving the acceleration operation signal, the control module 4 may control the transmission 150 in the normal traveling mode.

When operation S41 of controlling the transmission in the normal traveling mode is performed, the agricultural work vehicle 100 may travel according to the degree of operation of the acceleration operation mechanism 1421 after starting. Accordingly, the driver may allow the agricultural work vehicle 100 to travel at a desired traveling speed by operating the acceleration operation mechanism 1421.

Operation S42 of controlling the transmission in the idling travel mode may be performed by controlling the transmission 150 in the idling travel mode when it is identified that the acceleration operation mechanism 1421 is in the acceleration release state. Operation S42 of controlling the transmission 150 in the idling travel mode may be performed by the control module 4. When receiving the acceleration release signal, the control module 4 may control the transmission 150 in the idling travel mode. When operation S42 of controlling the transmission in the idling travel mode is performed, the agricultural work vehicle 100 may travel at the preset low traveling speed in a state in which the acceleration operation mechanism 1421 is not operated. Accordingly, the driver may allow the agricultural work vehicle 100 to travel at the present low traveling speed even without operating the hand throttle 14211 and the accelerator pedal 14212.

Referring to FIGS. 1 to 6 and 8, operation S20 of controlling the transmission in the traveling standby mode may include operation S21 of switching the transmission in the traveling standby mode.

Operation S21 of switching the transmission 150 in the traveling standby mode may be performed by switching the transmission 150 in the traveling standby mode as the releasing of the main clutch 150*a* is maintained. In this case, in operation S21 of switching the transmission 150 in the traveling standby mode, even when it is identified that the clutch operation mechanism 143 is in a state in which the agricultural work vehicle 100, the engine of which is started, is stopped in the fastening operation state, the releasing of the main clutch 150*a* may be maintained. Operation S21 of switching the transmission 150 in the traveling standby mode may be performed by the control module 4. When the front-rear clutch 1511 corresponds to the main clutch 150*a*, in operation S21 of switching the transmission 150 in the traveling standby mode, the releasing of the front-rear clutch 1511 may be maintained even when the shuttle lever 141 is in the front-rear operation state and the clutch operation mechanism 143 is in the fastening operation state. When the traveling clutch 1521 corresponds to the main clutch 150*a*, in operation S21 of switching the transmission 150 in the traveling standby mode, the releasing of the traveling clutch 1521 may be maintained even when the clutch operation mechanism 143 is in the fastening operation state. In this case, in operation S21 of switching the transmission in the traveling standby mode, as the shuttle lever 141 is in the front-rear operation state, the front-rear clutch 1511 may be fastened.

When the transmission 150 is implemented as the DCM, operation S21 of switching the transmission 150 in the traveling standby mode is performed by the transmission 150 in the traveling standby mode by fastening any one of the first traveling clutch 1521*a* and the second traveling clutch 1521*b* or by maintaining the fastening of any one of the first traveling clutch 1521*a* and the second traveling clutch 1521*b*. In this case, the front-rear clutch 1511 may correspond to the main clutch 150*a*. When the front-rear clutch 1511 corresponds to the main clutch 150*a*, the control module 4 may control the transmission 150 so that the releasing of the front-rear clutch 1511 is maintained, any one of the first traveling clutch 1521*a* and the second traveling clutch 1521*b* is fastened, or the fastening of any one of the first traveling clutch 1521*a* and the second traveling clutch 1521*b* is maintained.

Referring to FIGS. 1 to 9, the transmission control method of the agricultural work vehicle according to the present disclosure may roughly include a first embodiment and a second embodiment according to a method of changing a control manner of controlling the transmission 150 in the normal traveling mode and the idling travel mode. Such a first embodiment and a second embodiment will be sequentially described below in detail with reference to the accompanying drawings.

First Embodiment

Referring to FIGS. 1 to 7, a transmission control method of an agricultural work vehicle according to a first embodiment of the present disclosure will be implemented as follows.

First, operation S10 of identifying an operation state of the operation unit may be performed by identifying the operation state of the shuttle lever 141, the operation state of the acceleration operation mechanism 1421, and the operation state of the clutch operation mechanism 143 in a state in which the agricultural work vehicle 100, the engine of which is started, is stopped.

In operation S10 of identifying the operation state of the operation unit, operation S12 of identifying the operation state of the traveling operation mechanism may include operation S121 of identifying the operation state of the acceleration operation mechanism. Operation S121 of identifying the operation state of the acceleration operation mechanism may be performed by identifying whether the acceleration operation mechanism 1421 is in a state in which the agricultural work vehicle 100, the engine of which is started, is stopped in the acceleration operation state or the acceleration release state. Operation S121 of identifying the operation state of the acceleration operation mechanism may be performed by the identification module 3.

Next, operation S20 of controlling the transmission 150 in the traveling standby mode may be performed by controlling the transmission 150 in the traveling standby mode when it is identified that the shuttle lever 141 is in the front-rear operation state, the acceleration operation mechanism 1421 is in the acceleration release state, and the clutch operation mechanism 143 is in a state in which the agricultural work vehicle 100, the engine of which is started, is stopped in the fastening operation state. In this case, in operation S21 of switching the transmission 150 in the traveling standby mode, when it is identified that the shuttle lever 141 is in the front-rear operation state, the acceleration operation mechanism 1421 is in the acceleration release state, and the clutch operation mechanism 143 is in the fastening operation state, the releasing of the main clutch 150*a* is maintained, and thus the transmission 150 may be switched to the traveling standby mode.

Next, operation S30 of identifying the operation state of the traveling operation mechanism in the traveling standby mode may include operation S31 of identifying the operation state of the acceleration operation mechanism in the traveling standby mode. In the traveling standby mode, operation S31 of identifying the operation state of the acceleration operation mechanism may be performed by identifying whether the acceleration operation mechanism 1421 is in the acceleration operation state or the acceleration release state. In the traveling standby mode, operation S31 of identifying the operation state of the acceleration operation mechanism may be performed by the identification module 3.

Next, operation S40 of controlling the transmission 150 in the traveling mode may include operation S43 of fastening the main clutch, operation S41 of controlling the transmission 150 in the normal traveling mode, and operation s42 of controlling the transmission 150 in the idling travel mode.

In the traveling standby mode, when it is identified that the acceleration operation mechanism 1421 is in the acceleration operation state (S31), operation S43 of fastening the main clutch may be performed by fastening the main clutch 150*a*. Operation S43 of fastening the main clutch may be performed by the control module 4. In the traveling standby mode, when receiving the acceleration operation signal from the identification module 3, the control module 4 may control the transmission 150 so that the main clutch 150*a* is fastened. When the main clutch is fastened, the agricultural work vehicle 100 may travel at a traveling speed corresponding to the degree of operation of the acceleration operation mechanism 1421.

Operation S43 of fastening the main clutch may be performed before operation S41 of controlling the transmission in the normal traveling mode and operation S42 of controlling the transmission in the idling travel mode are performed. Operation S43 of fastening the main clutch may be performed after operation S31 of identifying the operation state of the acceleration operation mechanism is performed in the traveling standby mode.

Next, operation S40 of controlling the transmission in the traveling mode may include operation S44 of identifying the operation state of the acceleration operation mechanism in a state in which the main clutch is fastened.

Operation S44 of identifying the operation state of the acceleration operation mechanism in a state in which the main clutch is fastened may be performed by identifying whether the acceleration operation mechanism 1421 is in a state in which the main clutch 150*a* is fastened in the acceleration operation state or the acceleration release state. Operation S44 of identifying the operation state of the acceleration operation mechanism in a state in which the main clutch is fastened may be performed by the identification module 3. The identification module 3 may identify whether the acceleration operation mechanism 1421 is in the acceleration operation state or the acceleration release state on the basis of the operation information of the acceleration operation mechanism 1421 in a state in which the main clutch 150*a* is fastened.

Operation S44 of identifying the operation state of the acceleration operation mechanism in a state in which the main clutch is fastened may be performed before operation S41 of controlling the transmission in the normal traveling mode and operation S42 of controlling the transmission in the idling travel mode are performed. Operation S44 of identifying the operation state of the acceleration operation mechanism in a state in which the main clutch is fastened may be performed after operation S43 of fastening the main clutch is performed.

In the transmission control method of an agricultural work vehicle according to the first embodiment of the present disclosure, operation S41 of controlling the transmission in the normal traveling mode and operation S42 of controlling the transmission in the idling travel mode may be implemented as follows.

Operation S41 of controlling the transmission in the normal traveling mode may be performed by controlling the transmission 150 in the normal traveling mode when it is identified that the acceleration operation mechanism 1421 is in a state in which the main clutch 150a is fastened in the acceleration operation state. In the traveling standby mode, as it is identified that the acceleration operation mechanism 1421 is in the acceleration operation state, the main clutch 150a may be in a fastened state. In this case, operation S41 of controlling the transmission in the normal traveling mode may be performed by controlling the transmission in the normal traveling mode when it is identified that the acceleration operation mechanism 1421 is in a state in which the main clutch 150a is fastened in the acceleration operation state.

Operation S42 of controlling the transmission in the idling travel mode may be performed by controlling the transmission 150 in the idling travel mode when it is identified that the acceleration operation mechanism 1421 is in a state in which the main clutch 150a is fastened in the acceleration release state.

In this way, in the traveling standby mode, the transmission control method of an agricultural work vehicle according to the first embodiment of the present disclosure may be implemented to control the transmission 150 so that the main clutch 150a is fastened according to the operation state of the acceleration operation mechanism 1421 and to control the transmission 150 in the normal traveling mode or the idling travel mode according to the operation state of the acceleration operation mechanism 1421 in a state in which the main clutch 150a is fastened.

Second Embodiment

Referring to FIGS. 1 to 5, 8, and 9, a transmission control method of an agricultural work vehicle according to a second embodiment of the present disclosure will be implemented as follows.

First, operation S10 of identifying an operation state of the operation unit 140 may be performed by identifying the operation state of the shuttle lever 141, the operation state of the acceleration operation mechanism 1421, the operation state of the brake pedal 1422, and the operation state of the clutch operation mechanism 143 in a state in which the agricultural work vehicle 100, the engine of which is started, is stopped.

In operation S10 of identifying the operation state of the operation unit, operation S12 of identifying the operation state of the traveling operation mechanism may include operation S121 of identifying the operation state of the acceleration operation mechanism, and operation S122 of identifying the operation state of the brake pedal. Operation S121 of identifying the operation state of the acceleration operation mechanism 1421 may be performed by identifying whether the acceleration operation mechanism 1421 is in a state in which the agricultural work vehicle 100, the engine of which is started, is stopped in the acceleration operation state or the acceleration release state. Operation S122 of identifying the operation state of the brake pedal 1422 may be performed by identifying whether the brake pedal 1422 is in a state in which the agricultural work vehicle 100, the engine of which is started, is stopped in the braking state or the non-braking state. Operation S121 of identifying the operation state of the acceleration operation mechanism and operation S122 of identifying the operation state of the brake pedal may be performed by the identification module 3.

Next, operation S20 of controlling the transmission 150 in the traveling standby mode may be performed by controlling the transmission 150 in the traveling standby mode when it is identified that the shuttle lever 141 is in the front-rear operation state, the acceleration operation mechanism 1421 is in the acceleration release state, the brake pedal 1422 is in the braking state, and the clutch operation mechanism 143 is in a state in which the agricultural work vehicle 100, the engine of which is started, is stopped in the fastening operation state. In this case, in operation S21 of switching the transmission 150 in the traveling standby mode, when it is identified that the shuttle lever 141 is in the front-rear operation state, the acceleration operation mechanism 1421 is in the acceleration release state, the brake pedal 1422 is in the braking state, and the clutch operation mechanism 143 is in the fastening operation state, the releasing of the main clutch 150a is maintained, and thus the transmission 150 may be switched to the traveling standby mode.

Next, operation S30 of identifying the operation state of the traveling operation mechanism in the traveling standby mode may include operation S32 of identifying the operation state of the brake pedal in the traveling standby mode. Operation S32 of identifying the operation state of the brake pedal in the traveling standby mode may be performed by identifying whether the brake pedal 1422 is in the braking state or the non-braking state in the traveling standby mode. In the traveling standby mode, operation S32 of identifying the operation state of the brake pedal may be performed by the identification module 3.

Next, operation S40 of controlling the transmission in the traveling mode may include operation S43 of fastening the main clutch, operation S41 of controlling the transmission in the normal traveling mode, and operation s42 of controlling the transmission in the idling travel mode.

In the traveling standby mode, when it is identified that the brake pedal 1422 is in the non-braking state (S32), operation S43 of fastening the main clutch may be performed by fastening the main clutch 150a. Operation S43 of fastening the main clutch may be performed by the control module 4. In the traveling standby mode, when receiving the non-braking signal from the identification module 3, the control module 4 may control the transmission 150 so that the main clutch 150a is fastened. When the main clutch is fastened, the agricultural work vehicle 100 may start traveling at the preset low traveling speed.

Operation S43 of fastening the main clutch may be performed before operation S41 of controlling the transmission in the normal traveling mode and operation S42 of controlling the transmission in the idling travel mode are performed. Operation S43 of fastening the main clutch may be performed after operation S31 of identifying the operation state of the acceleration operation mechanism is performed in the traveling standby mode.

Next, operation S40 of controlling the transmission in the traveling mode may include operation S44 of identifying the operation state of the acceleration operation mechanism in a state in which the main clutch is fastened.

Operation S44 of identifying the operation state of the acceleration operation mechanism in a state in which the main clutch is fastened may be performed by identifying whether the acceleration operation mechanism 1421 is in a state in which the main clutch 150a is fastened in the acceleration operation state or the acceleration release state. Operation S44 of identifying the operation state of the acceleration operation mechanism in a state in which the main clutch is fastened may be performed by the identification module 3. The identification module 3 may identify whether the acceleration operation mechanism 1421 is in the acceleration operation state or the acceleration release state on the basis of the operation information of the acceleration operation mechanism 1421 in a state in which the main clutch 150a is fastened.

Operation S44 of identifying the operation state of the acceleration operation mechanism in a state in which the main clutch is fastened may be performed before operation S41 of controlling the transmission in the normal traveling mode and operation S42 of controlling the transmission in the idling travel mode are performed. Operation S44 of identifying the operation state of the acceleration operation mechanism in a state in which the main clutch is fastened may be performed after operation S43 of fastening the main clutch is performed.

In the transmission control method of an agricultural work vehicle according to a second embodiment of the present disclosure, operation S41 of controlling the transmission in the normal traveling mode and operation S42 of controlling the transmission in the idling travel mode may be implemented as follows.

Operation S41 of controlling the transmission in the normal traveling mode may be performed by controlling the transmission 150 in the normal traveling mode when it is identified that the acceleration operation mechanism 1421 is in a state in which the main clutch 150a is fastened in the acceleration operation state.

Operation S42 of controlling the transmission in the idling travel mode may be performed by controlling the transmission 150 in the idling travel mode when it is identified that the acceleration operation mechanism 1421 is in a state in which the main clutch 150a is fastened in the acceleration release state. Meanwhile, since the acceleration operation mechanism 1421 has been maintained in the acceleration release state from the traveling standby mode, operation S42 of controlling the transmission in the idling travel mode may be performed by controlling the transmission 150 in the idling travel mode when it is identified that the acceleration operation mechanism 1421 is maintained in a state in which the main clutch 150a is fastened in the acceleration release state.

In this way, in the traveling standby mode, the transmission control method of an agricultural work vehicle according to the first embodiment of the present disclosure may be implemented to control the transmission 150 so that the main clutch 150a is fastened according to the operation state of the brake pedal 1422, and to control the transmission 150 in the normal traveling mode or the idling travel mode according to the operation state of the acceleration operation mechanism 1421 in a state in which the main clutch 150a is fastened.

The present disclosure described above is not limited to the above-described embodiments and the accompanying drawings, and it is apparent to those skilled in the art to which the present disclosure belongs that various substitutes, modifications, and changes can be made without departing from the technical spirit of the present disclosure.

The invention claimed is:

1. A method of controlling a transmission in an agricultural work vehicle including a front-rear clutch of a front-rear shifting part that performs front-rear shifting with respect to driving generated by an engine and a traveling clutch of a travel shifting part that performs travel shifting with respect to the driving generated by the engine, the agricultural work vehicle having an operation unit including:

a shuttle lever that is positionable by a human operator to be in one of a front-rear operation state or a neutral operation state, a traveling operation mechanism that is positionable by the human operator to be in one of a traveling operation state or a traveling release state, and a clutch operation mechanism that is positionable by the human operator to be in one of a release operation state or a fastening operation state, the method comprising:

while the engine is running and the vehicle is not moving:

identifying whether the shuttle lever is in the front-rear operation state in which the transmission is configured to apply the driving generated by the engine to move the agricultural work vehicle forward or rearward or in the neutral operation state in which the transmission is configured to not apply the driving generated by the engine to move the agricultural work vehicle, identifying whether the traveling operation mechanism is in the traveling operation state or in the traveling release state in which the agricultural work vehicle does not travel, and identifying whether the clutch operation mechanism is in:

the release operation state in which a main clutch is to be placed in a released state for not transmitting the driving; or in the fastening operation state in which the main clutch is to be placed in a fastened, state for transmitting the driving, wherein the main clutch is a given one of the front-rear clutch and the traveling clutch;

in response to identifying that that the shuttle lever is in the front-rear operation state, the traveling operation mechanism is in the traveling release state, and the clutch operation mechanism is in the fastening operation state:

switching the transmission to a traveling standby mode in which the main clutch is maintained in the released state despite the shuttle lever being in the front-rear operation state and the clutch operation mechanism being in the fastening operation state, wherein a different one of the front-rear clutch and the traveling clutch than the given one is in the fastened state in the traveling standby mode.

2. The method of claim 1, further comprising:

identifying an operation state of the traveling operation mechanism in the traveling standby mode; and controlling the transmission in a traveling mode in which the agricultural work vehicle travels when identified in the traveling standby mode that the traveling operation mechanism is in the traveling operation state in which the agricultural work vehicle travels.

3. The method of claim 2, wherein the traveling operation mechanism comprises an acceleration operation mechanism, and identifying the operation state of the traveling operation mechanism in the traveling standby mode includes identifying whether the acceleration operation mechanism is in an acceleration operation state or an acceleration release state; and wherein controlling the transmission in the traveling mode includes fastening the main clutch in response to identifying that the acceleration operation mechanism is in the acceleration operation state.

4. The method of claim 3, wherein controlling the transmission in the traveling mode comprises:

controlling the transmission in a normal traveling mode in which the agricultural work vehicle travels according to a degree of operation of an acceleration operation mechanism when it is identified in the traveling standby mode that the acceleration operation mechanism of the traveling operation mechanism is in the acceleration operation state in which the agricultural work vehicle is accelerated and controlling the transmission in an idling travel mode in which the agricultural work vehicle travels in a state in which the engine is in an idle state when it is identified in the traveling standby mode that the acceleration operation mechanism is in the acceleration release state in which the agricultural work vehicle is not accelerated.

5. The method of claim 2, wherein the traveling operation mechanism comprises a brake pedal, and identifying the operation state of the traveling operation mechanism in the traveling standby mode includes identifying whether the brake pedal is in a braking state or a non-braking state; and
wherein controlling the transmission in the traveling mode includes fastening the main clutch in response to identifying that the brake pedal is in the non-braking state.

6. The method of claim 1, wherein the traveling operation mechanism comprises an acceleration operation mechanism, and identifying whether the traveling operation mechanism is in the traveling operation state or the traveling release state includes identifying whether the acceleration operation mechanism is in an acceleration operation state or an acceleration release state, and
wherein switching the transmission to the traveling standby mode is in response to identifying that the shuttle lever is in the front-rear operation state, the acceleration operation mechanism is in the acceleration release state, and the clutch operation mechanism is in the fastening operation state.

7. The method of claim 1, wherein the traveling operation mechanism comprises an acceleration operation mechanism and a brake pedal, and identifying whether the traveling operation mechanism is in the traveling operation state or the traveling release state includes identifying whether the acceleration operation mechanism is in an acceleration operation state or an acceleration release state and identifying whether the brake pedal is in a braking state or a non-braking state; and
wherein switching the transmission to the traveling standby mode is in response to determining that that the shuttle lever is in the front-rear operation state, the acceleration operation mechanism is in the acceleration release state, the brake pedal is in the braking state, and the clutch operation mechanism is in the fastening operation state.

8. The method of claim 1, wherein switching the transmission to the traveling standby mode includes:
fastening or maintaining in the fastened state in any one of a first traveling clutch and a second traveling clutch,
wherein the first traveling clutch is connected to at least one of a first leading shifting mechanism and a first trailing shifting mechanism of the travel shifting part,
wherein the second traveling clutch is connected to at least one of a second leading shifting mechanism and a second trailing shifting mechanism of the travel shifting part, and
wherein switching the transmission to the traveling standby mode maintains the front-rear clutch in the released state when the front-rear clutch is the main clutch.

9. A device for controlling a transmission in an agricultural work vehicle including a front-rear clutch of a front-rear shifting part that performs front-rear shifting with respect to driving generated by an engine and a traveling clutch of a travel shifting part that performs travel shifting with respect to the driving generated by the engine, the device comprising:

an operation unit including:
a shuttle lever for front-rear shifting control, positionable by a human operator to be in a front-rear operation state or a neutral operation state,
a traveling operation mechanism for traveling control, positionable by the human operator to be in a traveling operation state or a traveling release state, and
a clutch operation mechanism for release control of a main clutch, wherein the clutch operation mechanism is positionable by the human operator to be in a release operation state or a fastening operation state, wherein the main clutch is any one of the front-rear clutch and the traveling clutch;
wherein the vehicle is configured, when the engine is running and based on respective states of the shuttle lever, the traveling operation mechanism, and the clutch operation mechanism to operate in one of:
a traveling standby mode in which the agricultural work vehicle is maintained in a stopped state,
a normal traveling mode in which the agricultural work vehicle travels to correspond to operation of the traveling operation mechanism, and
an idling travel mode in which the agricultural work vehicle travels in a state in which the engine is in an idle state,
wherein, the transmission is switched to the traveling standby mode when the shuttle lever is in the front-rear operation state, the traveling operation mechanism is in the traveling release state, and the clutch operation mechanism is in the fastening operation state while the engine is running and the vehicle is not moving, and
in the traveling standby mode, a remaining clutch other than the main clutch among the front-rear clutch and the traveling clutch is switched to or maintained in a fastened state for transmitting the driving and the main clutch is in a released state for not transmitting the driving despite the shuttle lever being in the front-rear operation state and the clutch operation mechanism being in the fastening operation state.

10. The device of claim 9, wherein the traveling operation mechanism includes an acceleration operation mechanism of one of an accelerator pedal or a hand throttle that is configured to be positionable by the human operator via a foot or a hand, respectively, to be in an acceleration operation state or an acceleration release state, wherein the transmission is configured to switch to the traveling standby mode while the engine is running and the vehicle is not moving in response to:
(1) the shuttle lever being in the front-rear operation state;
(2) the acceleration operation mechanism being in the acceleration release state; and
(3) the clutch operation mechanism being in the fastening operation state.

11. The device of claim 10, wherein in response to identifying in the traveling standby mode that the acceleration operation mechanism is positioned in the acceleration operation state:
the transmission fastens the main clutch.

12. The device of claim 9, wherein the traveling operation mechanism comprises an acceleration operation mechanism of one of an accelerator pedal or a hand throttle that is configured to be positionable by the human operator via a foot or a hand, respectively, to be in an acceleration operation state or an acceleration release state, and brake pedal, positionable by the human operator to be in one of a braking state or a non-braking state for the agricultural work vehicle; and the brake pedal being in the braking state or the non-braking state affects whether the traveling operation mechanism is in the traveling release state or the traveling operation state, respectively, wherein, while the engine is running and the vehicle is not moving, the transmission is switched to the traveling standby mode in response to:

(1) the shuttle lever is in the front-rear operation state, (2) the acceleration operation mechanism is in the acceleration release state, (3) the brake pedal is in the braking state, and (4) the clutch operation mechanism is in the fastening operation state.

13. The device of claim 12, wherein the brake pedal being in the braking state or the non-braking state affects whether the traveling operation mechanism is in the traveling release state or the traveling operation state, respectively, and wherein the transmission fastens the main clutch in response to identifying in the traveling standby mode that the brake pedal is positioned to the non-braking state.

14. The device of claim 9, wherein when switching the transmission to the traveling standby mode, the transmission is configured to fasten or maintain in the fastened state any one of a first traveling clutch and a second traveling clutch, wherein the first traveling clutch is connected to at least one of a first leading shifting mechanism and a first trailing shifting mechanism of the travel shifting part, wherein the second traveling clutch is connected to at least one of a second leading shifting mechanism and a second trailing shifting mechanism of the travel shifting part, and wherein switching the transmission to the traveling standby mode maintains the front-rear clutch in the released state when the front-rear clutch is the main clutch.

* * * * *